March 12, 1968  H. VEHSE  3,372,694
FOOD COOKING AND HEATING UTENSIL
Filed May 11, 1966  4 Sheets-Sheet 1
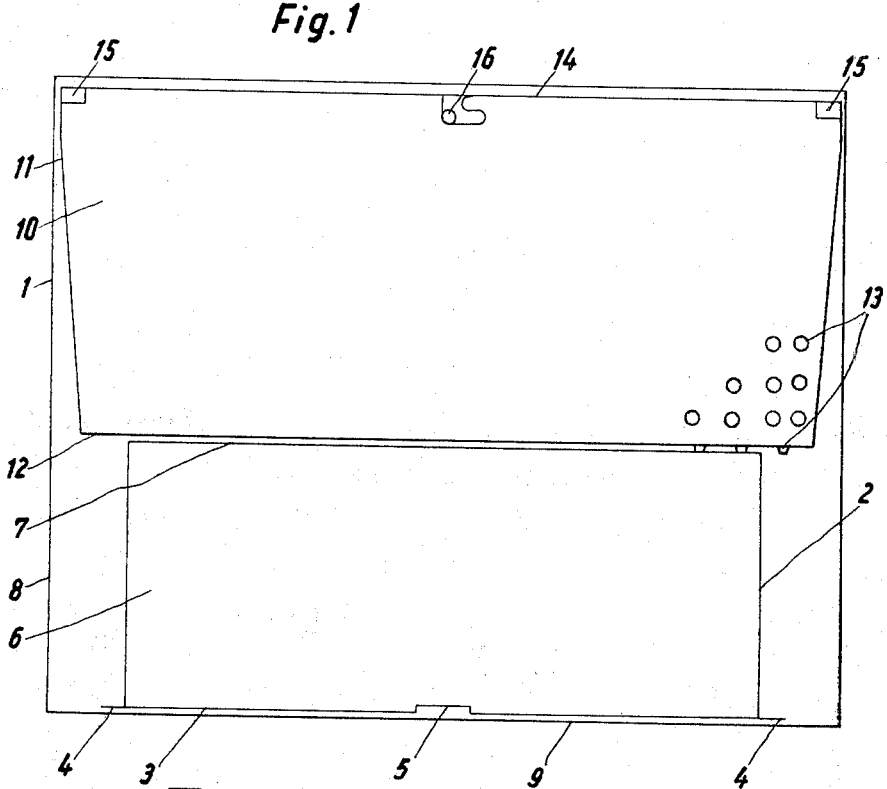
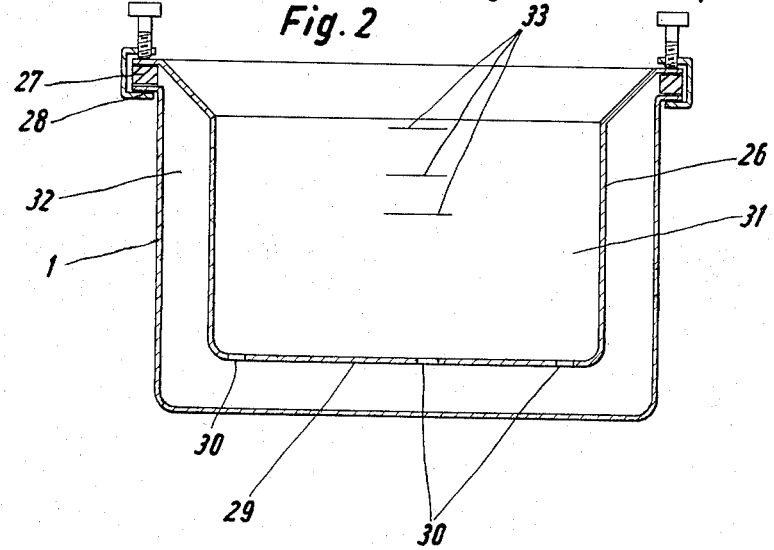
Inventor:
Helmuth VEHSE
by: Arthur O. Klein
his Attorney March 12, 1968 H. VEHSE 3,372,694
FOOD COOKING AND HEATING UTENSIL
Filed May 11, 1966 4 Sheets-Sheet 2

Inventor:
Helmuth VEHSE
by: Arthur O. Klein
his Attorney

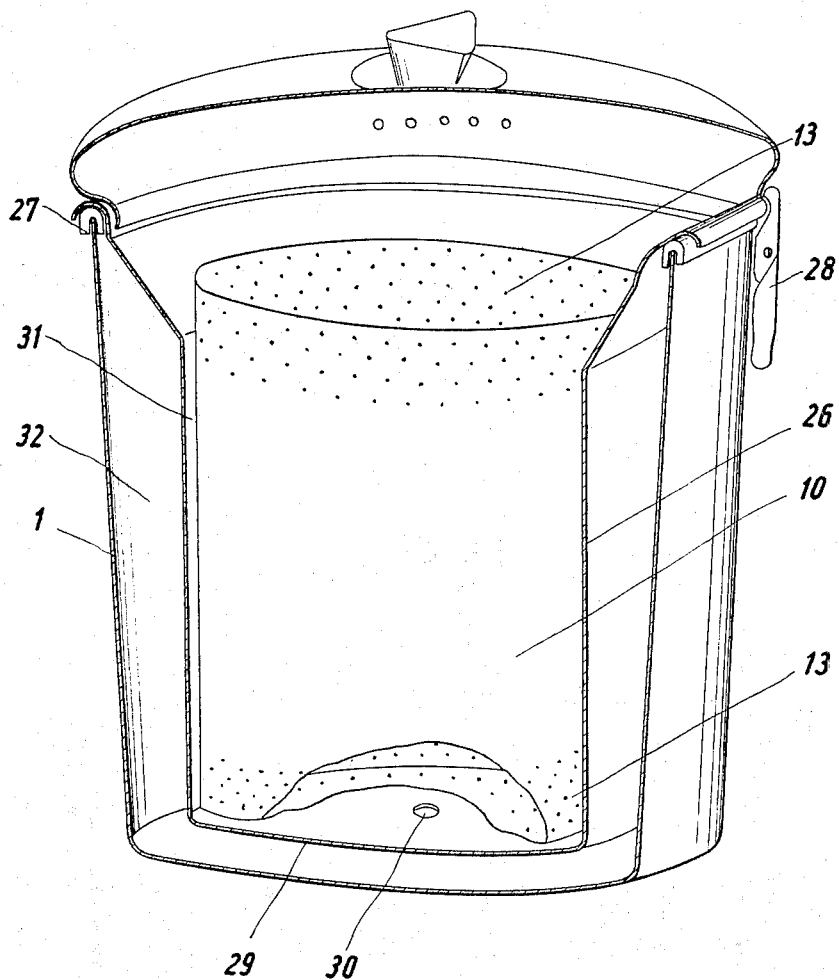

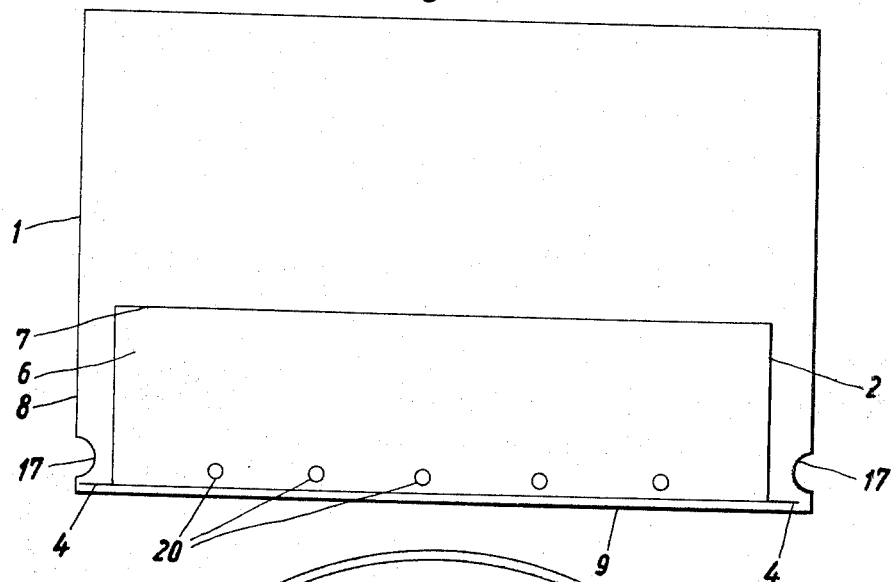
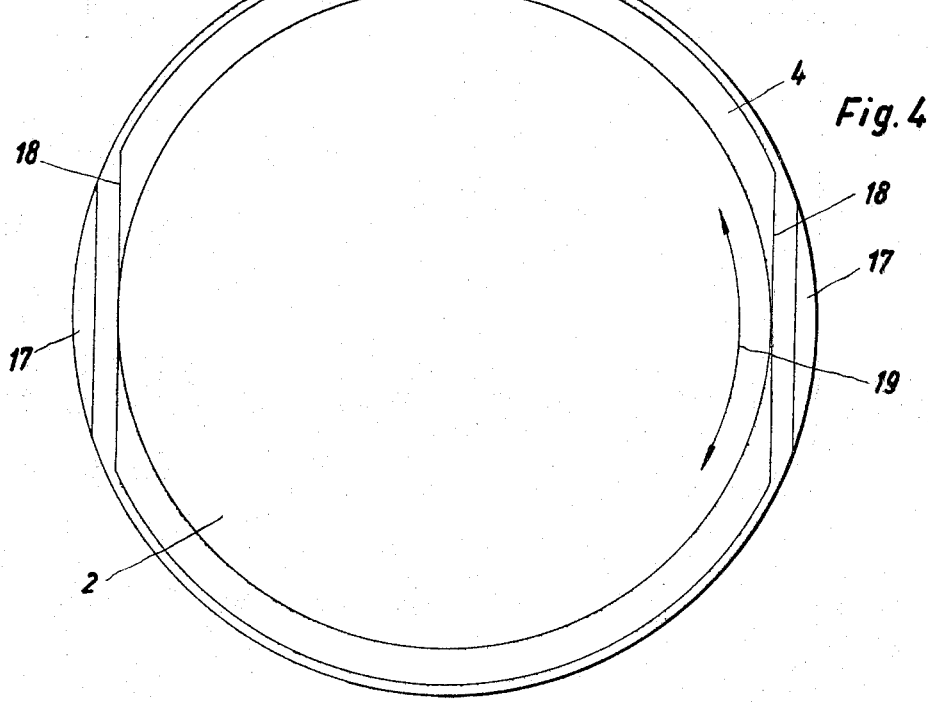

United States Patent Office 3,372,694
Patented Mar. 12, 1968

3,372,694
FOOD COOKING AND HEATING UTENSIL
Helmuth Vehse, 28 Oenekinger Weg, 588 Ludenscheid,
Westphalia, Germany
Filed May 11, 1966, Ser. No. 549,404
Claims priority, application Germany, May 12, 1965,
L 50,680; June 9, 1965, L 50,876; Aug. 12, 1965,
L 51,360
10 Claims. (Cl. 126—369)

ABSTRACT OF THE DISCLOSURE

A cooking utensil comprising at least two separate containers, which are arranged and shaped with respect to each other so that, when both containers are at least partially filled with a cooking liquid, a pocket of air will form, which is at least partially enclosed by the inner container of said two separate containers. When the cooking utensil is heated, the air in the pocket of air expands and pushes the cooking liquid towards food, temporarily placed in the cooking utensil, where it may be cooked in the cooking utensil. When the cooking utensil is thereafter cooled, a partial vacuum forms in said pocket of air, which causes an evacuation of the cooking liquid from the area where the food is being cooked into said pocket of air.

---

This invention relates to an improved cooking utensil which can be used as cooking pot and also as a heating pot.

This improved cooking utensil consists of an external cooking pot which has at least two separate compartments. These compartments may be defined by one or two inset pots which are mounted inside the external cooking pot. The cooking liquid leaves the actual cooking compartment, after the cooking operation has been completed, and is transferred into a special compartment of the cooking utensil of this invention.

The invention may be embodied in several ways. Two principal embodiments are set forth below by way of illustration.

It is already known to provide a cooking pot that consists of an inner pot and an outer pot, wherein the water located in the outer pot is heated to the boiling point in order to heat the food located in the inner pot.

It is further known to provide a combination of two pots, in particular for boiling milk, wherein the inner and outer pots are secured to each other along their upper rims. The outer pot of this combination has an inlet opening for insertion of water. This type of combination of pots permits the heating of food without burning or scorching it.

A great variety of frequently consumed staple foods, such as potatoes, noodles, rice etc. is cooked with water. After termination of the cooking process, the water is removed from the food by being drained off. Many of the modern kitchens of today are provided with electrical or gas ranges that have an automatic timing mechanism for turning on and/or shutting off the gas or electricity automatically according to a preselected setting. These types of automatic ranges have many obvious advantages, yet have one important drawback in that the cooked food remains in the cooking liquid in the event a person is not available to immediately remove the food after the gas or electricity has been automatically turned off. When the cooked food remains in the cooking liquid after the cooking process has been completed, the flavor and juices are leached out from the cooked food, which is highly undesirable. Thus, for example, boiled potatoes become quite tasteless. This deterioration of the boiled potatoes is even further accentuated when the usual steaming of the boiled potatoes does not take place immediately after the boiling because an attendant is not present. Thus, the basic purpose of the automatic range, i.e. the presence of an attendant not being required, can actually not be effectuated for the cooking of a great number of foods.

It is a general object of this invention to provide a cooking utensil which eliminates the aforedescribed disadvantages.

It is a more specific object of this invention to provide a cooking utensil, which automatically removes the cooking liquid immediately or shortly after the termination of the cooking process from an inner pot in which the cooked food is located to an outer pot.

Keeping these objects in view, I have devised a cooking utensil which is divided into at least two compartments forming an inner chamber and an outer chamber. The compartment forming the outer chamber may assume many different shapes, but only two embodiments are illustrated and described herein.

In a first embodiment, the inner chamber is defined by a bell-shaped container which is supported on the bottom of an outer pot.

In a second embodiment, the outer chamber is formed by the space between the inner pot and the outer pot, which together constitute the cooking utensil of my invention.

The cooking utensil of this invention is characterized in that either the aforementioned bell-shaped container, or an inner pot secured to the outer pot along their respective upper rims, form within or with the outer pot a closed chamber, the latter being in communication with the free space within an inner pot.

In the first embodiment, the bell-shaped container has a bottom flange which rests on the bottom of the outer pot. The bottom flange cooperates also with a pair of opposite inwardly projecting members which maintain the bell-shaped container in position inside the outer pot, after the bell-shaped container has been manually turned a predetermined angle. The bottom flange has a plurality of recesses to permit the passage of water or other cooking liquid therethrough. Alternately, the bell-shaped container may be provided with a plurality of small holes, located near the bottom flange, to permit the passage of water or other cooking liquid therethrough.

In the second embodiment of this invention, the inner pot has a plurality of holes in its bottom for permitting the passage of cooking liquid therethrough. The outer chamber, which is formed by the space between the inner and the outer pots, has at least the volume inside the inner pot up to the upper marking thereof.

In both embodiments of this invention, an inner pot is provided, which is supported in an outer pot, said inner pot having a plurality of holes at or near its bottom.

Various other objects, features and advantages of the present invention are apparent from the following description and from the accompanying drawings in which:

FIG. 1 is an elevation illustrating schematically a first embodiment of this invention;

FIG. 2 is a cross-sectional elevation illustrating schematically a second embodiment of this invention;

FIG. 2a is an illustration in perspective of a second embodiment of this invention;

FIG. 3 is an elevation illustrating schematically an alternate version of the bell-shaped container in the first embodiment of this invention; and FIG. 4 is a plan view of the embodiment illustrated in FIG. 3.

Similar reference characters are applied to similar structures throughout the drawings.

Figure 1A:
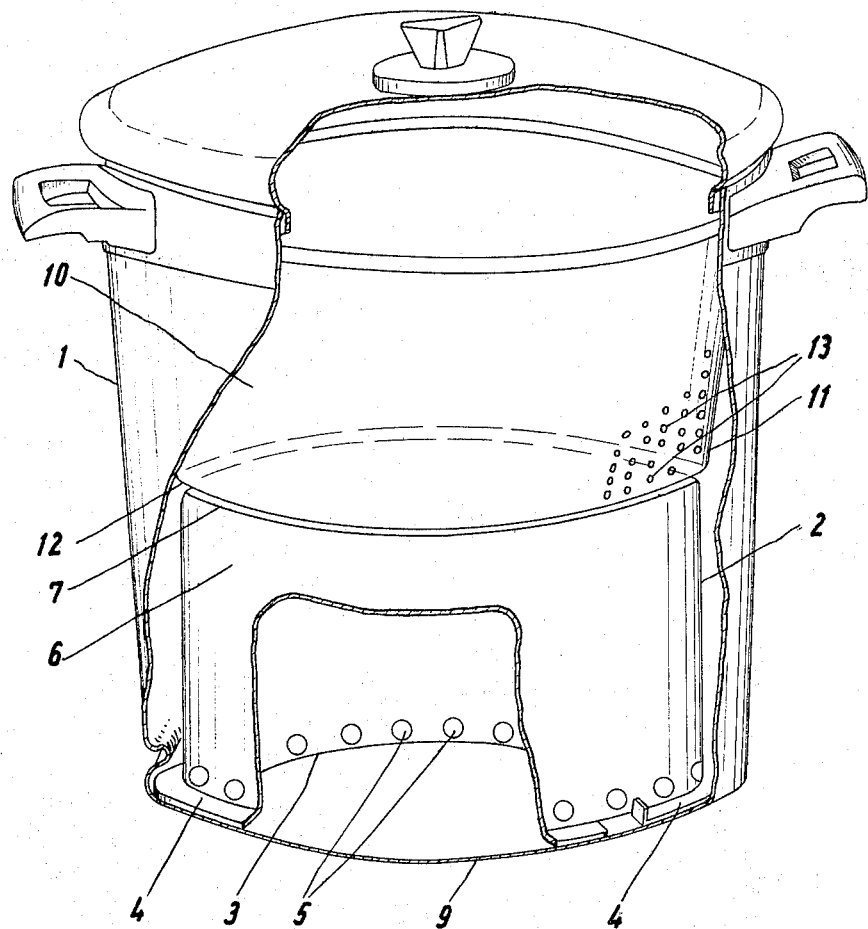
FIG. 1a is an illustration in perspective of the first embodiment of this invention.

A detailed description of the drawings will now be given. There is illustrated in FIG. 1 an outer cooking pot 1, made of suitable material in which there is positioned a bell-shaped container 2. The latter is provided with an outwardly extending bottom flange 4. Furthermore, the bell-shaped container 2 is provided at or near its bottom flange 4 with a plurality of recesses 5. The bell shaped container 2 has a flat top 7. The outer pot 1 is formed of side walls 8 and a bottom wall 9.

The inset pot 10, illustrated in FIG. 1, may also be used in the second embodiment, illustrated in FIG. 2, as will further be described below. The inset pot 10 includes side walls 11 and a bottom wall 12. It has a plurality of perforations 13 so that it may act as a sieve. The inset pot 10 may be provided at or near its upper rim with handles or other suitable means 15 for manually lifting the inset pot 10 out of the outer pot 1. The inset pot 10 may also be removably connected to the outer pot, as for example with bayonet-type connections 16.

The bell-shaped container 2 is also preferably removably connected to the outer pot 1. In a modified version of a first embodiment of this invention, there is illustrated in FIGS. 3 and 4 the bell-shaped container 2. The outer pot 1 has two inwardly projecting members 17 near the bottom 9 thereof. The flange 4 has two cutaway portions 18. By turning of the bell-shaped container in the direction of the arrow 19, the flange 4 can be positioned underneath the projecting members 17.

The bell-shaped container 2 must be constructed so as to permit passage of the cooking liquid into the container from below. In the embodiment illustrated in FIG. 1 the cooking liquid passes through the recesses 5. In the alternate version of the first embodiment, as illustrated in FIG. 3, the cooking liquid passes through the passages 20 into the bell-shaped container 2.

The second embodiment of this invention, which has been illustrated in FIG. 2, comprises an outer pot 1 and a pot inset 26 which is supported inside the outer pot 1. The upper rims of the pot inset 26 and the outer pot 1 are secured to each other in a gas tight manner. This can, for example, be done by means of a gasket ring 27 made of suitable elastomer material which is clamped by suitable means 28 between the upper rims of the outer pot 1 and the inset pot 26. At or near the bottom of the inset pot 26 there are provided a plurality of holes 30 which form passages between the inset pot 26 and the outer pot 1. The space 32, between the outer pot 1 and the inner pot 26, performs the same functions as the space 6 inside the bell-shaped container 2 illustrated in FIGS. 1 and 3. Several marking lines 33, the purpose of which will be described below, are affixed to the inner wall surface of the inset pot 26, which surround the interior space 31.

The functioning of the two embodiments is, in principle, the same.

The operation of the embodiment illustrated in FIG. 1 will be described first. The bell-shaped container 2 with its opening facing the bottom 9 of the outer pot 1 is placed inside the outer pot 1 so that the flange 4 rests on the bottom 3 of the outer pot 1. The bell-shaped container 2 is placed into the outer pot 1 in such a manner that the pair of cutaway portions 18 face the pair of inwardly projecting members 17. The bell-shaped container 2 is then rotated so that the flange 4 is positioned underneath the pair of inwardly projecting members 17. In this way, the bell-shaped container 2 is secured against being lifted during the cooking operation of the device.

Thereafter, a cooking liquid, as for example water, is being poured into the outer pot 1. A small portion of the liquid passes into the interior space 6 of the bell-shaped container 2 via the recesses 5 (FIG. 1), or the passages 20 (FIG. 3), and/or the gap, if any, between the flange 4 and the bottom 9 of the outer pot 1. There can only pass a relatively small amount of cooking liquid into the interior space 6 during the cooking operation because a cushion of air is formed therein which prevents the rising of the liquid beyond a certain point. The food to be cooked can now be placed directly into the outer pot 1. Alternatively, the inset pot 10 is first positioned inside the outer pot 1 and the food to be cooked is then inserted into the inset pot 10. It is obviously also possible to first place the food to be cooked directly into the outer pot 1 or into the inset pot 10 and only then pour the cooking liquid into the device. When the inset pot 10 is utilized, the cooking liquid flows through the perforations 13.

Thereafter, a heat source is activated underneath the outer pot 1, which causes the cooking liquid and the food to be cooked to boil after a certain period of time. The boiling process continues until the food is done. Thereafter, the heat source is either manually, or automatically deactivated by means of a timing device.

The following process now occurs: There is formed, during the cooking process, in the interior space 6 inside the bell-shaped container 2 a certain steam pressure. After the heat source has been deactivated, this steam pressure collapses suddenly or in a relatively short time and a partial vacuum is formed in the bell-shaped container 2. This vacuum causes the cooking liquid to pass from the outer pot 1 through the recesses 5, or the openings 20, and/or the gap, if any, between the flange 4 and the bottom 9, into the interior space 6 of the bell-shaped container 2 where the cooking liquid remains. When an inset pot 10 is used in the first embodiment, the cooking liquid passes downwardly through the perforations 13. In this manner, practically all of the cooking liquid is removed from the inset pot 10 and/or the outer pot 1. At most there remains a small amount of liquid at the bottom 9 of the outer pot 1. Thus, the cooking liquid is removed from the cooked food and the latter can now be steamed. The steaming process takes place completely automatically, since the interior of the device remains at an elevated temperature for a considerable time. This remanent heat energy is caused by the heated cooking liquid which is now located in the interior space 6 of the bell-shaped container 2, which slowly gives up its heat energy in an upward direction to the cooked food. The cooked food can be removed, in the event a pot inset 10 is used, by disconnecting the bayonet type connections 16 and lifting the inset pot 10 manually out of the outer pot 1 by means of the handles of other suitable means 15.

The second embodiment of this invention, which is illustrated in FIG. 2, functions, in principle, as the first embodiment. Thus, the food to be cooked is placed in the interior space 31 of the inner pot 26. Thereafter, cooking liquid is poured into the inner pot 26 until its level reaches a preselected one of the marking lines 33. A portion of the cooking liquid passes through the polarity of holes 30 into the spaces 32 between the inner pot 26 and the outer pot 29, while the remainder stays in the interior space 31. During the heating of the device the liquid immediately above the bottom of the outer pot 1 is heated and then rises and mixes with liquid in the interior space 31 where the food to be cooked is located. In this manner, a continuous heat exchange takes place until the liquid inside the interior space 31 begins to boil.

During the boiling process there is formed in the interior space 32, which is located between the outer pot 1 and the inset pot 26, a cushion of steam, which prevents the cooking liquid located in the space 31 from passing to any substantial degree into the space 32. After the heating source has been deactivated and the boiling process has been terminated, the temperature of the cooking liquid descends below its boiling point temperature, whereby there is suddenly formed in the space 32 a partial vacuum. The latter causes the cooking liquid, located in the interior space 31, to pass via the plurality of holes 30, into the space 32 where it remains. The cooking liquid, now located in the space 32, forms a good heat insulator and heat energy reservoir, whereby the cooked food can be maintained for a considerable period of time in a heated condition.

Thus, it can be noted that the embodiments respectively illustrated in FIGS. 1 and 2 function along the same lines. A partial vacuum is formed either in the chamber 6 or 32, which causes a transfer of the cooking liquid thereto. The embodiment selected or variations thereof depend entirely on the purposes and uses for which the device is intended.

The food cooking and heating utensil of this invention offers many advantages. The cooked food can be kept in a heated condition for a relatively long time, as the removed cooking liquid continues to give up heat energy. Furthermore, it is a particularly advantageous feature of this device that the flavor and natural juices of the food cooked in a device of this invention are not leached out by the cooking liquid, since the latter is being automatically removed after the boiling process has been completed. The presence of an attendant for decanting the cooking liquid after the heat source has been automatically deactivated can also be dispensed with. The fact that the decanting step, with the concomitant danger of scalding the attendant person, has been eliminated, is also an important advantage. The concomitant production of hot steam during decanting has also been eliminated by the device of this invention. The danger of burning and/or scorching the cooked food has also been eliminated. The steaming of the cooked food, as for example boiled potatoes, can also be eliminated with the cooking utensil of this invention. The inset pot is easily removable. The entire device can be easily cleaned.

It is understood that any suitable heat-resistant plastic or metal may be used for manufacturing the various parts forming the cooking and heating utensil of this invention.

While the invention has been described with particular reference to two specific embodiments, it is to be understood that it is not to be limited thereto, but is to be construed broadly and restricted solely by the scope of the appended claims.

What I claim is:

1. A food cooking and heating utensil, comprising in combination, a first open container, a second open container mounted in said first container, said second container having passage means for the passage of a cooking liquid therethrough, said first and second containers are respectively adapted to be filled with a cooking liquid to predeterminate levels said second container including wall means for forming a hermetically sealed space to enclose a pocket of air which is at least partially enclosed by said wall means of said second container whereby when said first continer is being externally heated and subsequently cooled, a partial vacuum is formed in said pocket which causes a transfer of cooking liquid into said pocket via said passage means.

2. The food cooking and heating utensil as set forth in claim 1, wherein said first and second containers are pot-shaped, the upper rims of said pot-shaped first and second containers being secured to each other in a gas-tight manner, said pocket being formed between the vertical walls of said first and second containers, said passage means being located at the bottom of said second container.

3. The food cooking and heating utensil as set forth in claim 1, wherein said first container is pot-shaped and said second container is bell-shaped and is supported on the bottom of said first container, said pocket being located inside said bell-shaped second container.

4. The food cooking and heating utensil as set forth in claim 3, wherein said bell-shaped second container has a flange member projecting outwardly along its lower periphery, said flange member resting on the bottom of said first container.

5. The food cooking and heating utensil as set forth in claim 4, wherein said passage means are formed as recesses in said flange member.

6. The food cooking and heating utensil as set forth in claim 4, wherein said bell-shaped second container includes vertical wall means, said passage means being formed as a plurality of holes in said vertical wall means.

7. The food cooking and heating utensil as set forth in claim 3, including a third pot-shaped upwardly open container removably mounted upright in said first container over said second container, said third container having second passage means for the passage of cooking liquid therethrough and being adapted to hold food therein.

8. The food cooking and heating utensil as set forth in claim 7, wherein said third container is removably connected to the vertical walls of said first container by means of a bayonet-type connection.

9. The food cooking and heating utensil as set forth in claim 4, wherein said flange member has at least one cutout portion, a mating stop member inwardly projecting from the vertical walls of said first container, said flange member being adapted to be positioned underneath said stop member inside and near the bottom of said first container.

10. The food cooking and heating utensil as set forth in claim 7, wherein substantially all of the cooking liquid in said third container is transferred into said pocket via said first and second passage means.

References Cited

UNITED STATES PATENTS

| | | | |
|---|---|---|---|
| 143,171 | 9/1873 | Lundgren | 126—369 |
| 831,746 | 9/1906 | Rundell | 126—369 |
| 1,750,596 | 3/1930 | Hois | 126—369 |
| 2,089,411 | 8/1937 | Olsson et al. | 126—369 |

KENNETH W. SPRAGUE, Primary Examiner.